June 26, 1923.

L. AIMÉ

1,460,333

CLOTHESLINE FASTENER

Filed Jan. 4, 1923

WITNESSES
E. A. Wilson
A. L. Kitchin

INVENTOR
LUIS AIMÉ
BY Munn & Co.
ATTORNEYS

Patented June 26, 1923.

1,460,333

UNITED STATES PATENT OFFICE.

LUIS AIMÉ, OF WEST HOBOKEN, NEW JERSEY.

CLOTHESLINE FASTENER.

Application filed January 4, 1923. Serial No. 610,624.

*To all whom it may concern:*

Be it known that I, LUIS AIMÉ, a citizen of the United States, and a resident of West Hoboken, in the county of Hudson and State of New Jersey, have invented a new and Improved Clothesline Fastener, of which the following is a full, clear, and exact description.

This invention relates to clothesline fastening devices and particularly to an improved fastener for connecting the ends of a line together and has for an object to provide a construction in which means are presented which may be manually actuated for firmly connecting the loose ends of the line together so that they will not separate until the fastener has been shifted.

Another object of the invention is to provide a fastener to connect two ends of a rope together, the device being so constructed that by looping the ends of the line they may be locked against movement in respect to each other.

A still further object of the invention is to provide a manually actuated tubular fastening member for connecting two ends of a line together, the arrangement being such that the interlocked or looped ends of the line are wedged in the device and against independent movement.

In the accompanying drawing—

Figure 1:
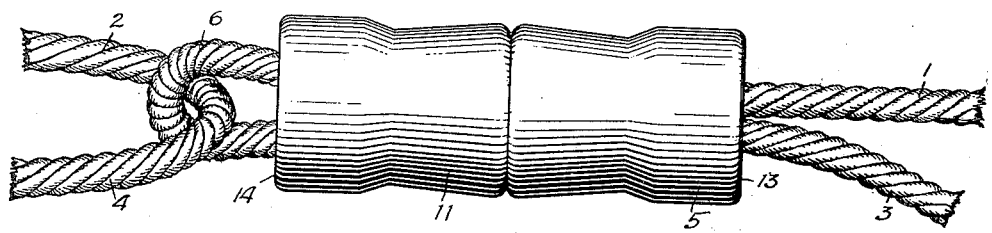
Figure 1 is a side view of a fastener disclosing an embodiment of the invention, the same being shown in a position immediately before being brought to an operated position.
Figure 2:
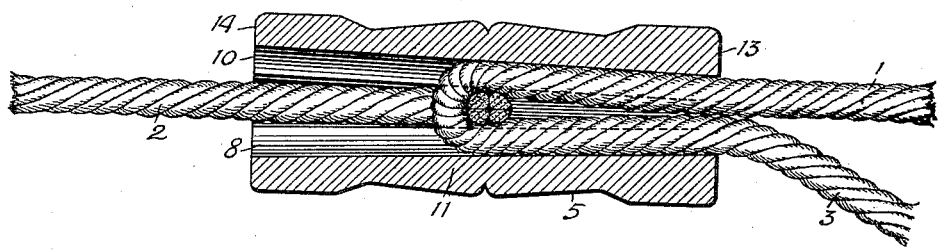
Figure 2 is a longitudinal vertical section through the structure shown in Figure 1 with the rope in an operated or fastened position.

Referring to the accompanying drawing by numerals, 1 indicates a rope and 2 a second rope, said ropes being looped together as indicated in Figure 1 so that the ends 3 and 4 will extend in the opposite direction. It will be noted that the fastener 5 is slidingly mounted on the end 3 and part of the rope 1, said fastener being designed to be slipped over the interlocking looped portions 6 of the respective ropes 1 and 2, the movement of member 5 continuing until the parts appear substantially as shown in Figure 2 whereupon the respective ropes 1 and 2 are firmly connected together. A pull on either rope will not produce an unfastening or disengaging action when the parts are in the position shown in Figure 2 but if the fastener 5 was moved to the right from the position shown in Figure 2, the ropes would be loosened and permitted a disengagement.

Figure 3:
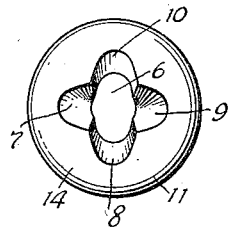
Figure 3 is an end view of the fastener shown in Figure 2.
Figure 4:
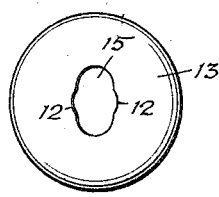
Figure 4 is an end view showing the opposite end of the fastener to that illustrated in Figure 3.
Figure 5:
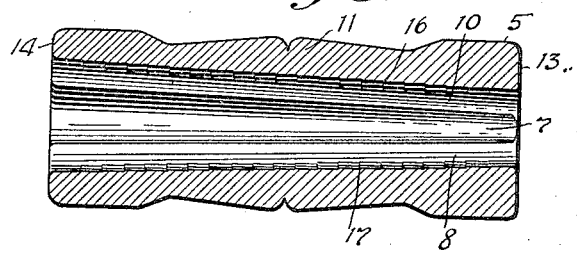
Figure 5 is a longitudinal vertical section through a modified form of fastener to that illustrated in Figure 1.

It will be noted that the fastener 5 is a tubular structure having an opening or passage-way 6 extending entirely therethrough, which passage-way merges into four grooves 7, 8, 9 and 10, grooves 8 and 10 extending entirely through the body 11 while the grooves 7 and 9 extend approximately from one end to the other without strictly speaking, extending entirely through the device. This is illustrated by the tapering arrangement of the groove 7 as illustrated in Figure 5, which groove only forms a slight arc-shaped structure 12 at the end 13 illustrated in Figure 4 while at the end 14 illustrated in Figure 3, the grooves are substantially semi-circular.

It will be noted that all of the grooves taper and that the opening 15 in the end 4 is not as large as the opening or passage-way 16 at end 14. In fact, the opening 15 is only slightly larger than the rope 1 and the end section 3 whereby it may be folded and inserted when mounting the fastener 5 thereon.

In using the device, the rope 1 is pulled over at the end for forming an end section 3 and then the looped part is thrust into the opening 15 and along through the passage-way 6 until it projects beyond the fastener 5 as illustrated in Figure 1. The end of the opposite rope is then looped into position as shown in Figure 1 and the parts pulled until they assume the position shown in Figure 2. When the parts are pulled to the position shown in Figure 2, the interlocked parts will be squeezed together and each rope and its respective ends will be pressed toward a central point so that there will be a firm interlocking action with the friction exerted on substantially all parts of the rope. Under some circumstances, it may be desirable to use the modified structure shown in Figure 4 to increase this friction. This modified structure is identical with that shown in Figure 2 except that teeth or roughened portions 16 and 17 are provided at the bottom of grooves 8 and 10. It will be noted that the fastener 5 may be quickly moved into fastening or clamping position and quickly moved therefrom so that the length of rope 2 may be varied as occasion may demand or the parts may be readily disconnected with ease.

The device may connect the ends of any two ropes or lines but it is particularly designed for use on clotheslines as these lines are more or less in continuous use and it is necessary to connect the ends of a pulley line more or less often.

What I claim is:—

1. In a clothesline fastener of the character described, the combination with the ends of a line which have been interlocked, of a tubular fastener adapted to be slid thereover formed with merging grooves, there being a groove for each line and the end of each line.

2. A clothesline fastener, comprising a tubular member having a passage-way therethrough merging into four converging grooves, said grooves tapering from one end to the other.

3. A fastener for clotheslines, comprising a tubular body having a substantially elliptical passage-way extending entirely therethrough, and four grooves merging into said passage-way, said grooves being arranged at right angles to each other.

4. A clothesline fastener of the character described, comprising a tubular body having a substantially elliptical passage-way extending therethrough, and a plurality of tapering grooves merging into said passage-way, certain of said grooves being provided with toothed or roughened bottoms.

LUIS AIMÉ.